April 15, 1969     R. SMITH     3,438,581
INTERNALLY GIMBALED VECTORING NOZZLE

Filed Feb. 6, 1967     Sheet _1_ of 2

INVENTOR.
RAYMOND SMITH

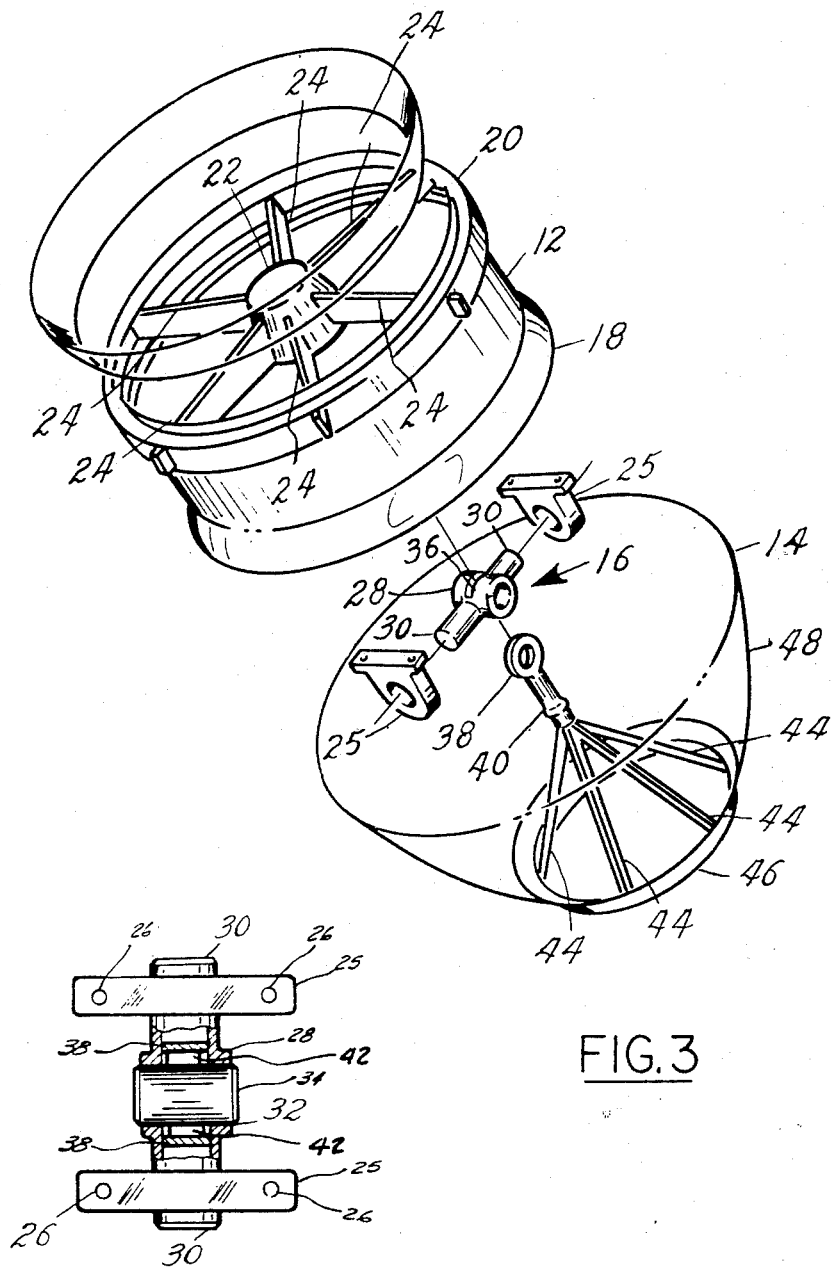

United States Patent Office 3,438,581
Patented Apr. 15, 1969

3,438,581
INTERNALLY GIMBALED VECTORING NOZZLE
Raymond Smith, Fraser, Mich., assignor to Continental Aviation and Engineering Corporation, Detroit, Mich., a corporation of Virginia
Filed Feb. 6, 1967, Ser. No. 614,305
Int. Cl. B64c 15/04; F02k 1/24
U.S. Cl. 239—265.35                11 Claims

ABSTRACT OF THE DISCLOSURE

Internally gimbaled means for supporting a spherical gas deflecting nozzle to the main exhaust nozzle of a jet engine. A universal joint carried in the exhaust duct of the main nozzle is attached to the inner ends of supporting struts carried by the deflecting nozzle. The deflecting nozzle is supported downstream with a spherical portion engaging the end of the main nozzle to form a continuous discharge duct for the thrust gases in all relative positions of the nozzles.

BACKGROUND OF THE INVENTION

Field of the invention

This invention relates to thrust control devices for the exhaust gases of reaction engines and more specifically to an internally gimbaled, spherical, nozzle section for vectoring the exhaust gases of a jet engine.

Description of the prior art

A major engineering problem associated with the useful employment of the thrust gases developed by jet engines relates to the efficient vectoring of the thrust gases. An efficient thrust vectoring system is essential for the aircraft associated with the engine in order to achieve attitude control and for purposes of the take-off control. A major factor in a successful vectoring nozzle supporting system is the achievement of a high installed thrust to aircraft weight ratio. In addition, the supporting means must not add significantly to the volume and length of the installed engine.

Various thrust vectoring concepts of the prior art which in general meet the foregoing requirements include rotating cascades and externally supported spherical nozzles. The rotating cascades concept is relatively sophisticated, so that for simplicity in design the externally gimbaled concept has received a great deal of attention. However, external gimballing of conventional nozzle engines is difficult to accomplish and adds to the final thrust to weight ratio.

Summary of the invention

Studies of thrust vector control systems have indicated that distinct weight savings can be achieved by employing an internally supported spherical nozzle section. The preferred embodiment of the present invention, which will be described in greater detail, takes the form of an annular reinforcing ring mounted near the end of the main nozzle section defining the exhaust duct for the delivery of the thrust gases from a suitable reaction engine. A supporting spider is fixed to the reinforcing ring with a hub supported on the longitudinal axis of the main nozzle and in the exhaust duct. A universal joint is mounted on the hub and supports a rearwardly extending elongated support member. The deflector nozzle is fixed to the support member by a plurality of supporting struts so that the deflector nozzle member can move relative to the main nozzle member. The deflector nozzle has a spherical portion engaged with the end of the main nozzle section in all positions of relative movement of the nozzle sections so that a continuous exhaust duct is provided for the thrust gases.

The universal joint supports the deflector nozzle for movement around a pair of mutually perpendicular axes arranged transversely to the longitudinal axis of the main nozzle. This arrangement provides an efficient means for vectoring the exhaust gases of the jet engine. The simplicity of the preferred mounting is inherently superior to conventional externally mounted spherical nozzles in addition to providing a substantially lighter and more compact unit.

It is therefore an object of the present invention to provide an internally supported vectoring nozzle for the main discharge nozzle of a jet engine.

It is another object of the present invention to provide an improved vectoring nozzle mounting arrangement having a high thrust to weight ratio by providing means mounted along the axis of the exhaust duct of the main nozzle which support the vectoring nozzle for movement about a pair of mutually perpendicular axis, each of which is disposed transversely to the main thrust axis of the main exhaust duct.

It is still a further object of the present invention to provide a mounting arrangement for the vectoring nozzle of a reaction engine having a spherical vectoring nozzle supported for relative movement to the main nozzle by a universal joint mounted at the hub of a spider fixed to the main nozzle, the hub arranged along the axis of the exhaust duct defined by the main nozzle.

Still further objects and advantages of the present invention will readily occur to one skilled in the art to which the invention pertains upon reference to the following detailed description.

Brief description of the drawings

The description makes reference to the accompanying drawings in which like reference characters refer to like parts throughout the several views and in which:

FIGURE 2 is a transverse sectional view taken along lines 2—2 of FIGURE 1; and

FIGURE 3 is an exploded perspective view illustrating the various components comprising the nozzle arrangement illustrated in FIGURE 1.

Description of the preferred embodiment

Figure 1:
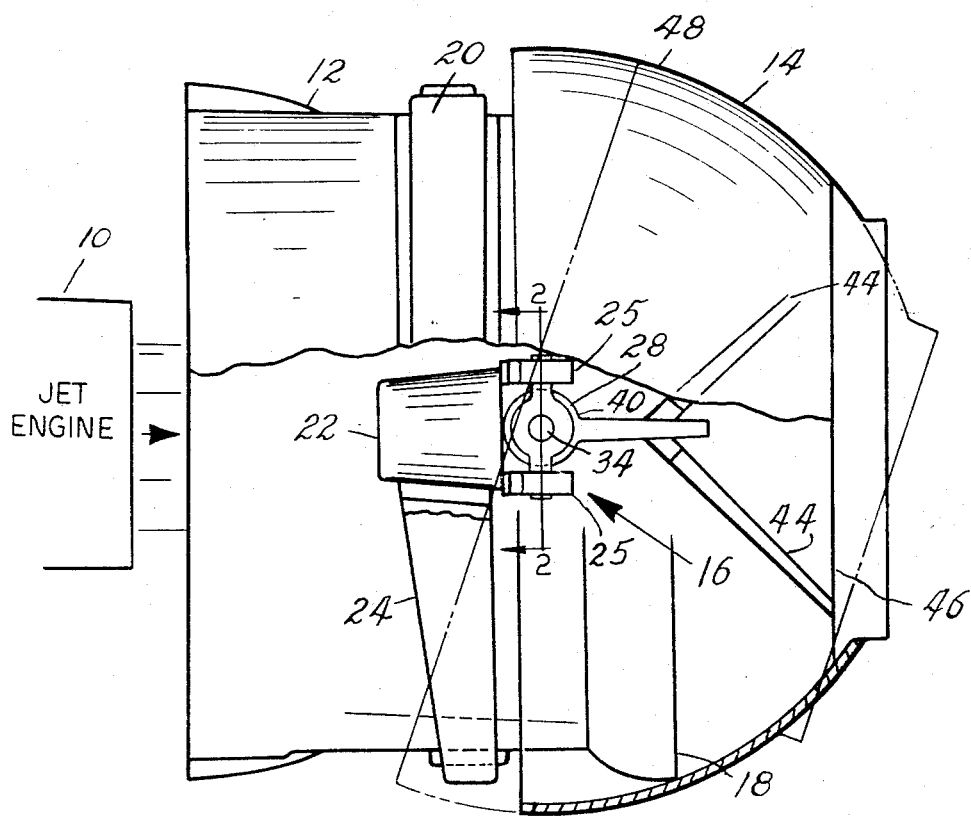
FIGURE 1 is a side elevational view of a nozzle assembly illustrating a preferred embodiment of the present invention, with parts in section for purposes of clarity and other parts illustrated schematically.

Now referring to the drawings, FIGURE 1 illustrates a reaction engine 10 of any conventional type. Engine 10 develops exhaust gases which are discharged rearwardly to develop thrust for an aircraft associated with the engine. A main nozzle 12 delivers the gases developed by the engine 10 rearwardly. In order to deflect the thrust gases to develop lateral forces relative to the longitudinal axis of the main nozzle 12, a discharge nozzle 14 is supported to the main nozzle 12 by mounting means generally indicated at 16.

Now referring to FIGURES 1 and 3, the main nozzle 12 has a generally cylindrical configuration and terminates rearwardly with a slightly flared end portion 18.

A reinforcing ring 20 is fixed preferably to the exterior surface of the main nozzle 12.

A hub 22 is mounted on the longitudinal axis of the nozzle 12 and coaxially with the reinforcing ring 20. The hub 22 is supported by a plurality of reinforcing arms 24 each of which is fixed to the ring 20. Preferably the hub 22 is slightly tapered in a direction toward the engine 10 to reduce any distortion in the flow pattern of the exhausting gases caused by the mounting arrangement. It can therefore be seen that the hub 22, the arms 24 and the reinforcing ring 20 provide a rigid framework or spider for transferring forces developed by the movable nozzle 14 through the mounting means 16 and to the sidewalls of the main nozzle 12.

Now as can best be seen in FIGURES 2 and 3, the mounting means 16 comprises a pair of spaced apart bearing assemblies 25 fixed to the hub 22 by threaded fasteners 26.

A trunnion member 28 having a pair of oppositely directed shaft sections 30 is carried by the bearings 25. The shaft sections 30 are formed on a common axis and arranged such that they are rotatable about an axis arranged transversely to the longitudinal axis of the main nozzle section 12.

The trunnion member 28 further defines a bore 32 formed on an axis perpendicular to the axis defined by the shaft sections 30. A supporting shaft 34 is fixed in the bore 32. The trunnion member 28 has cutout portions 36 adapted to receive an eye portion 38 of an elongated support member 40. The eye portion 38 is journaled for rotation about the axis of the shaft 34 preferably by a roller bearing assembly 42. Thus the cutout portions 36 are arranged to permit the support member 40 to rotate about the axis of the shaft 34 while simultaneously the trunnion member 28 is rotatable about the axis defined by the shaft sections 30.

A plurality of strut members 44 are attached to the rearward end of the support member 40. The movable nozzle section 14 is provided with an annular section 46 which defines the terminal end of the discharge opening of the nozzle assembly. The annular section 46 is rigidly fixed to the outer rearward ends of the struts 44. Thus it can be seen that the mounting means 16 permits the movable nozzle section 14 to rotate about a pair of mutually perpendicular axes each of which is arranged transversely to the passage for the exhaust gases defined by the main nozzle 12.

A spherical portion 48 defines the forward end of the movable nozzle 14. The inner surface of the spherical portion 48 has a diameter corresponding to the outer edge of the end portion 18 of the main nozzle. The outer edge of the end portion engages the inner surface of the spherical portion 48 so that a continuous duct is provided for the exhaust gases as the movable nozzle moves between its various relative positions.

Thus it is to be understood that I have described an improved mounting arrangement for supporting a vectoring nozzle to the main nozzle of a reaction engine wherein the mounting means are arranged interiorly of the main nozzle in the passage of the thrust gases. This arrangement is simple in design, light weight, compact, and reliable in operation.

Although I have described but one preferred embodiment of my invention it is to be understood that various modifications and changes can be made therein without departing from the spirit of the invention as expressed in the scope of the appended claims.

I claim:
1. In a jet engine having a main nozzle section, said main nozzle section defining a longitudinal axis and arranged to discharge a gas rearwardly from a source of said gas, a movable nozzle section having portions arranged downstream of said nozzle section to alter the direction of discharge of said gas from said main nozzle section, said main nozzle section and said movable nozzle section forming a continuous duct for the discharge of said gas, means for mounting said movable nozzle section to said main nozzle section comprising;
 (a) a first member supported in said duct, said first member defining a first axis arranged transversely to the longitudinal axis of said main nozzle, said first member supported for rotation about said first axis to one of said nozzle sections;
 (b) a second member supported in said duct, said second member defining a second axis, said second axis arranged transversely to the longitudinal axis of said main nozzle section and perpendicular to said first axis, said second member supported for rotation about said second axis to the opposite of said nozzle sections; and
 (c) support means interconnecting said first member to said second member, said support means arranged on the longitudinal axis of said main nozzle section so that said movable nozzle section is movable relative to said main nozzle section about said first and second axis.

2. The invention as defined in claim 1, including a spider section, said spider section having radial arms extending outwardly from the longitudinal axis of said main nozzle section, the outer ends of said radial arms fixed to the sidewall of said main nozzle section, and means supporting said first member for rotation, said supporting means fixed at the common intersection of the arms of said spider.

3. The invention is defined in claim 2, including means reinforcing the sidewalls of said main nozzle at the joinder of the outer ends of said radial arms to said sidewalls so that the reaction forces produced by said discharging gas on said movable nozzle are transmitted through said mounting means and said radial arms to the sidewalls of said main nozzle.

4. The invention as defined in claim 1, wherein said movable nozzle section has a spherical portion, said spherical portion engaging the end of said main nozzle section in all relative positions of said nozzle sections to form a continuous duct for the discharge of said gasses.

5. The invention as defined in claim 1, wherein said movable nozzle section defines a second nozzle axis, and said support means are arranged at the intersection of said second nozzle axis and said main nozzle axis.

6. The invention as defined in claim 5, wherein said support means comprises;
 (a) a joint member, said joint member having a pair of oppositely directed shaft sections, said shaft sections formed on a common axis, said common axis coincident with said first axis;
 (b) bearing means, said bearing means supporting said shaft sections for rotation about said first axis;
 (c) said second member being supported by said joint member for rotation about said second axis; and
 (d) means rigidly supporting said movable nozzle section to said second member.

7. The invention as defined in claim 6, wherein said last mentioned means comprise;
 (a) said second member having a rearwardly extending elongated section, said elongated section formed on said movable nozzle axis; and
 (b) a plurality of nozzle supporting struts, the outer ends of said supporting struts fixed to said movable nozzle section, and the inner ends of said supporting struts fixed to the rearward end of said elongated section.

8. The invention as defined in claim 7, wherein said movable nozzle section has a spherical portion, said spherical portion engaging the end of said main nozzle section in all relative positions of said nozzle sections to form a continuous duct for the discharge of said thrust gasses.

9. In a jet engine having a main nozzle section, a movable nozzle section and means mounting said movable nozzle section to said main nozzle section to permit movement of said movable nozzle section to positions altering the direction of gas flow therethrough, said mounting means comprising:
 (a) a first means disposed interiorly of said nozzle sections in the path of gas flow therethrough and mounting said movable nozzle section to said main nozzle section for relative pivotal movement with respect thereto about a first axis,
 (b) a second means disposed interiorly of said nozzle sections in the path of gas flow therethrough and supporting said first means with respect to said nozzle sections for relative pivotal movement about a second axis, and (c) said second axis being disposed angularly with respect to said first axis whereby said movable nozzle section can be moved about two axes with respect to said main nozzle section.

10. The invention as defined in claim 9 and in which said second axis is substantially 90° with respect to said first axis.

11. The invention as defined in claim 9 and in which said movable nozzle section has a spherical portion, said spherical portion engaging the end of said main nozzle section in all relative positions of said nozzle sections to form a continuous duct for the discharge of said gases.

References Cited

UNITED STATES PATENTS

| 2,780,059 | 2/1957 | Fiedler | 239—265.35 |
| 2,938,459 | 5/1960 | McGraw et al. | 239—265.35 |
| 3,048,977 | 8/1962 | Geary | 239—265.35 |
| 3,073,630 | 1/1963 | Kuhn | 239—265.35 |

EVERETTE W. KIRBY, *Primary Examiner.*

U.S. Cl. X.R.

60—232; 244—52